United States Patent
Ivankovic et al.

(10) Patent No.: US 9,906,136 B2
(45) Date of Patent: Feb. 27, 2018

(54) SYSTEM AND METHOD FOR LLC CONVERTER DESIGN

(71) Applicant: Infineon Technologies North America Corp., Durham, NC (US)

(72) Inventors: Mladen Ivankovic, Oakville (CA); Fred Sawyer, Foxboro, MA (US)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 503 days.

(21) Appl. No.: 14/590,778

(22) Filed: Jan. 6, 2015

(65) Prior Publication Data

US 2016/0197556 A1 Jul. 7, 2016

(51) Int. Cl.
  *G06G 7/62* (2006.01)
  *H02M 3/335* (2006.01)

(52) U.S. Cl.
  CPC ......... *H02M 3/335* (2013.01); *Y02B 70/1433* (2013.01)

(58) Field of Classification Search
  None
  See application file for complete search history.

(56) References Cited

U.S. PATENT DOCUMENTS

| | | | |
|---|---|---|---|
| 7,745,970 B2* | 6/2010 | Radecker | H02M 7/537 310/316.01 |
| 7,746,671 B2* | 6/2010 | Radecker | H02M 3/33507 323/244 |

(Continued)

OTHER PUBLICATIONS

Ivensky et al. Approximate Analysis of Resonant LLC DC-DC Converter IEEE Transactions on Power Electronics, vol. 26, No. 11, Nov. 2011, pp. 3274-3284.*

(Continued)

*Primary Examiner* — Omar Fernandez Rivas
*Assistant Examiner* — Cuong Luu
(74) *Attorney, Agent, or Firm* — Slater Matsil, LLP (57) ABSTRACT

An embodiment method for designing a power converter system includes receiving, by a processor, power converter design parameters. The design parameters include a minimum DC input voltage $V_{min}$ and a maximum DC input voltage $V_{max}$, a minimum switching frequency $f_{min}$ and a maximum switching frequency $f_{max}$ of a switching bridge of the power converter, and a target output voltage and a target output power. The method also includes calculating, by the processor, a first power converter configuration. The first power converter configuration includes a calculated magnetizing inductance $L_{mc}$ equal to $R_e \tan(\phi)(2\pi f_{min})^{-1}$, where $\phi$ is a load angle complement equal to a $\sin(V_{min}V_{max}^{-1})$, and $R_e$ is an equivalent reflected load resistance of the power converter. The first power converter configuration also includes a calculated resonant inductance $L_{rc}$ equal to $L_{mc} \cos^2(\phi)(f_{max}^2 f_{min}^{-2}-1)^{-1}$ and a calculated resonant capacitance $C_{rc}$ equal to $L_{rc}^{-1}(2\pi f_{max})^{-2}$.

19 Claims, 5 Drawing Sheets

(56) References Cited

U.S. PATENT DOCUMENTS

| | | | | |
|---|---|---|---|---|
| 8,102,679 B2* | 1/2012 | Gong | ............... | H02M 3/156 |
| | | | | 363/21.04 |
| 9,601,990 B2* | 3/2017 | Jin | ............... | H02M 1/4241 |
| 2012/0294047 A1* | 11/2012 | Wang | ............... | H02M 3/33576 |
| | | | | 363/21.02 |
| 2015/0349649 A1* | 12/2015 | Zane | ............... | H02M 3/33507 |
| | | | | 363/21.03 |

OTHER PUBLICATIONS

Liu et al. A Novel Precise Design Method for LLC Series Resonant Converter IEEE 2006.*
Lu et al. Optimal Design Methodology for LLC Resonant Converter IEEE 2006, pp. 533-538.*
Wu et al. A New Current-Driven Synchronous Rectifier for Series-Parallel Resonant (LLC) DC-DC Converter IEEE Transactions on Industrial Electronics, vol. 58, No. 1, Jan. 2011, pp. 289-297.*
Abdel-Rahman, "Resonant LLC Converter: Operation and Design, 250W 33Vin 400Vout" Infineon Technology North America (INFA) Corp., Application Note AN Sep. 2012 V1.0, Sep. 2012, 19 pages.
Infineon Technologies, "Design Guide for LLC Converter with ICE2HS01G," Application Note, Version 1.0, Jul. 2011, 26 pages.
Infineon Technologies, "Eval-2HS01G-300W—300W LLC Evaluation Board with LLC Controller ICE2HS01G," Application Note, Version 1.1, May 2012, 20 pages.
Infineon Technologies, "ICE2HS01G, High Performance Resonant Mode Controller," Datasheet, Version 2.1, May 24, 2011, 29 pages.
Infineon Technologies, "600W Halfbridge LLC, Evaluation Board," Nov. 4, 2014, 27 pages.

* cited by examiner

SYSTEM AND METHOD FOR LLC CONVERTER DESIGN

TECHNICAL FIELD

The present invention relates generally to a system and method for designing Direct Current-to-Direct Current (DC-to-DC) power converters, and, in particular embodiments, to a system and method for inductance-inductance-capacitance (LLC) converter design.

BACKGROUND

DC-to-DC power converters are desired for many applications such as computer server systems and portable consumer electronics. Some DC-to-DC converters employ frequency switching that increases voltage gain to compensate for a partially lowered input voltage and thereby provide increased reliability, higher power density, and improved output voltage regulation. Additionally, LLC converters may support zero voltage switching to reduce switching losses and increase efficiency. LLC converters that are designed to operate within a specific range of switching frequencies may be used to reduce interference from electromagnetic signals and to switching losses and component size.

Nevertheless, designing such LLC power converters presents a number of challenges. Existing converter design techniques focus on achieving a particular voltage gain, but neglect design parameters for switching frequency range. Furthermore, these existing techniques are not capable of being automated. Additionally, existing electronic design automation (EDA) software tools allow designers of electronic systems such as printed circuit boards and integrated circuits to design and analyze entire semiconductor chips in a design flow. Yet these EDA tools do not currently support designing LLC power converters from given input and output design parameters.

SUMMARY

In accordance with an embodiment of the present invention, a method for designing a power converter system is provided. The method includes receiving, by a processor, power converter design parameters. The design parameters include a minimum DC input voltage $V_{min}$ and a maximum DC input voltage $V_{max}$, a minimum switching frequency $f_{min}$ and a maximum switching frequency $f_{max}$ of a switching bridge of the power converter, and a target output voltage and a target output power. The method also includes calculating, by the processor, a first power converter configuration. The first power converter configuration includes a calculated magnetizing inductance $L_{mc}$ equal to $R_e \tan(\phi)(2\pi f_{min})^{-1}$, where $\phi$ is a load angle complement equal to $a\sin(V_{min}V_{max}^{-1})$, and $R_e$ is an equivalent reflected load resistance of the power converter. The first power converter configuration also includes a calculated resonant inductance $L_{rc}$ equal to $L_{mc}\cos^2(\phi)(f_{max}^2 f_{min}^{-2}-1)^{-1}$ and a calculated resonant capacitance $C_{rc}$ equal to $L_{rc}^{-1}(2\pi f_{max})^{-2}$.

In accordance with another embodiment of the present invention, a power converter design system is provided. The system includes a non-transitory computer-readable medium storing programming. The programming includes instructions to receive power converter design parameters. These design parameters include a minimum DC input voltage $V_{min}$ and a maximum DC input voltage $V_{max}$, a minimum switching frequency $f_{min}$ and a maximum switching frequency $f_{max}$ of a switching bridge of the power converter; and a target output voltage $V_o$ and a target output power $P_o$. The programming also includes instructions to calculate a first power converter configuration, which includes a calculated magnetizing inductance $L_{mc}$ equal to $R_e \tan(\phi)(2\pi f_{min})^{-1}$, where $\phi$ is a load angle complement equal to a $\sin(V_{min}V_{max}^{-1})$, and $R_e$ is an equivalent reflected load resistance of the power converter. The first power converter configuration also includes a calculated resonant inductance $L_{rc}$ equal to $L_{mc}\cos^2(\phi)(f_{max}^2 f_{min}^{-2}-1)^{-1}$ and a calculated resonant capacitance $C_{rc}$ equal to $L_{rc}^{-1}(2\pi f_{max})^{-2}$.

In accordance with another embodiment of the present invention, a power conversion system is provided. The system includes a switching bridge that includes a plurality of switches coupled to a DC power source having a minimum input voltage $V_{min}$ and a maximum input voltage $V_{max}$. The switching bridge is configured to switch at a frequency that is not less than a minimum frequency $f_{min}$ and that is not greater than a maximum frequency $f_{max}$. The system also includes a primary side circuit coupled to the switching bridge. The primary side circuit includes a primary winding of a transformer. The system also includes a secondary winding magnetically coupled to the primary winding through a core of the transformer, and an output terminal coupled to the secondary winding. The output terminal is configured to supply an output voltage that is not greater than a maximum output voltage $V_o$ and an output power that is not greater than a maximum output power $P_o$. The transformer has a magnetizing inductance $L_m$ that is greater than $c_1 R_e(2\pi f_{min})^{-1}\tan(\phi)$ and less than $c_2 R_e(2\pi f_{min})^{-1}\tan(\phi)$, where $c_1$ is not less than 0.75 and $c_2$ is not greater than 1.25, where $\phi$ is a load angle complement equal to a $\sin(V_{min}V_{max}^{-1})$, and where $R_e$ is an equivalent reflected load resistance. The primary side circuit has a resonant inductance $L_r$ that is greater than $c_1 L_m(f_{max}^2 f_{min}^{-2}-1)^{-1}\cos^2(\phi)$ and less than $c_2 L_m(f_{max}^2 f_{min}^{-2}-1)^{-1}\cos^2(\phi)$. The primary side circuit has a resonant capacitance $C_r$ in series with the resonant inductance such that $C_r$ is greater than $c_1 L_r^{-1}(2\pi f_{max})^{-2}$ and less than $c_2 L_r^{-1}(2\pi f_{max})^{-2}$.

BRIEF DESCRIPTION OF THE DRAWINGS

For a more complete understanding of the present invention, and the advantages thereof, reference is now made to the following descriptions taken in conjunction with the accompanying drawings, in which FIG. 1, which includes

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for LLC converter design for use in EDA and other automated design systems. Further embodiments may be applied to other switched LLC converter design systems that require specifying a range of switching frequencies.

Figure 1A:
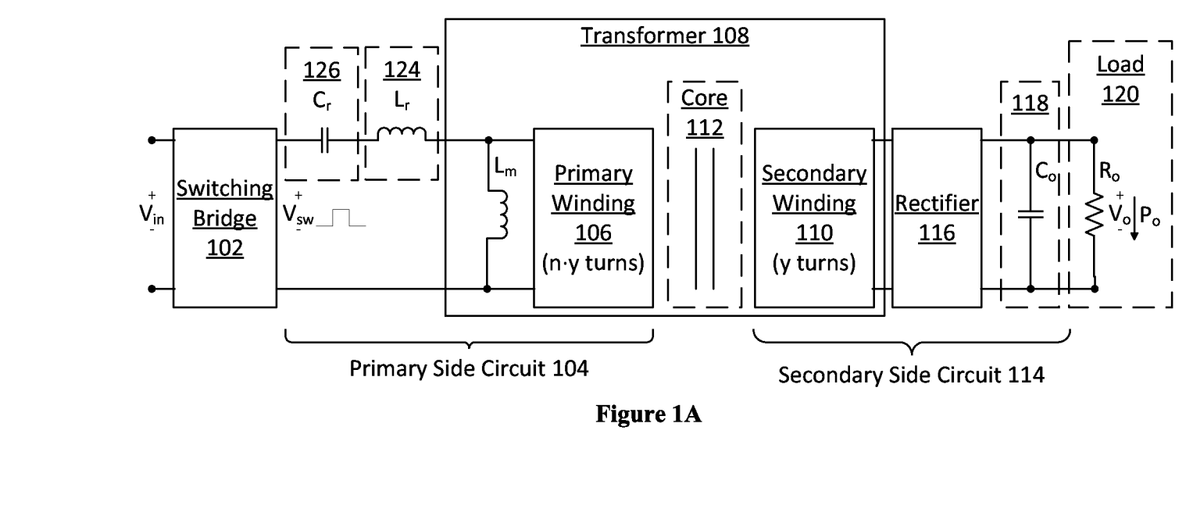
FIGS. 1A and 1B, is a block diagram showing a DC-to-DC power converter designed in accordance with embodiments of the present invention.
Figure 1B:
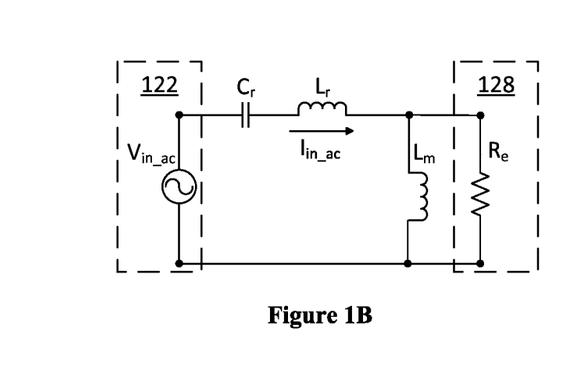

FIG. 1 shows a DC-to-DC power converter designed in accordance with embodiments of the present invention. FIG. 1A is an LLC converter circuit with a DC input coupled to a switching bridge and a transformer. FIG. 1B is an equivalent AC circuit that is a first harmonic approximation of the circuit of FIG. 1A.

FIG. 1A shows a DC-to-DC power converter that is an LLC converter having a parallel inductance, series resonant inductance, and series resonant capacitance on the primary side of a transformer. The power converter includes a switching bridge 102 that has multiple switches coupled to a DC power source providing an input voltage $V_{in}$. The DC power source has a minimum input voltage $V_{min}$ and a maximum input voltage $V_{max}$. The switching bridge 102 is configured to provide a switched voltage signal $V_{sw}$, which is a square wave that the switching bridge generates by switching at a frequency $f_{sw}$ that is not less than a minimum frequency $f_{min}$ and that is not greater than a maximum frequency $f_{max}$. The switching bridge may include, for example, Metal-Oxide-Semiconductor Field-Effect Transistor (MOSFET) switches.

The minimum switching frequency $f_{min}$ is chosen to be high enough for example, at least 30 to 40 kilohertz (kHz) or higher, to reduce interference from audio signals. The maximum switching frequency $f_{max}$ is chosen to be approximately equal to a resonant switching frequency $f_r$ of the resonant tank inductor 124 and the resonant tank capacitor 126. The inductance and capacitance of these components are in turn chosen so that the resonant switching frequency $f_r$ is both low enough to reduce switching losses and high enough to reduce the required size of the resonant tank inductor 124 and the resonant tank capacitor 126. In an embodiment, component values are selected to provide a resonant switching frequency/maximum switching frequency in the range of 80 to 200 kHz.

The combined required size of the resonant tank inductor 124 and the resonant tank capacitor 126 is proportional to the combined average peak energy $E(f_{xo})$ that is contained in each of these components at the minimum switching frequency, where $f_{xo}$ is a normalized minimum switching frequency equal to $f_{min}/f_r$. In turn, the average peak energy $E(f_{xo})$ is proportional to a function $f(f_{xo})$, which has a derivative $df(f_{xo})/df_{xo}$, such that:

$$f(f_{xo})=(1+f_{xo}^2)[(f_{xo})(1+f_{xo}^2)]^{-1} \quad \text{(Eq. 1A)}$$

$$df(f_{xo})/df_{xo}=f_{xo}^4+4f_{xo}^2-1 \quad \text{(Eq. 1B)}$$

$E(f_{xo})$ reaches a minimum energy level, and the combined required size of the resonant components is minimized, when the derivative $df(f_{xo})/df_{xo}$ is equal to zero, which occurs when $f_{xo}=0.485$. In an embodiment, $f_{min}$ and $f_r$ are selected so that the required size of the resonant components is not very sensitive to changes in $f_{xo}$. For example, if $f_{xo}$ is limited to vary within a range of (0.34, 0.63), which is centered on 0.485, $f(f_{xo})$ varies by around only ten percent (from 3.71 to 3.68), and therefore the required size of the resonant components varies by around only ten percent.

Referring again to FIG. 1A, the power converter also includes a primary side circuit 104 coupled to the switching bridge 102, and this primary side circuit 104 includes a primary winding 106 of a transformer 108. The transformer 108 also includes a secondary winding 110 magnetically coupled to the primary winding 106 through the transformer core 112. The secondary winding 110 is part of a secondary side circuit 114 that includes a rectifier 116 and an output capacitor 118 having a capacitance $C_o$. The secondary side circuit 114 is coupled at an output terminal to a load 120 having an output resistance $R_o$. The secondary side circuit supplies the load with an output voltage that is not greater than a maximum output voltage $V_o$ and an output power that is not greater than a maximum output power $P_o$. The transformer 108 has a magnetizing inductance $L_m$ across the primary winding 106. The primary side circuit 104 has a resonant tank inductor 124 having a resonant inductance $L_r$, and a resonant tank capacitor 126 in series with the resonant tank inductor 124. The resonant tank capacitor 126 has a resonant capacitance $C_r$. In other embodiments, part or all of the resonant inductance $L_r$ may be provided by a primary-side inductance of the transformer 108 or other primary-side components, so that a reduced resonant tank inductor or no resonant tank inductor is present. Similarly, in other embodiments part or all of the resonant capacitance $C_r$ may be provided by a primary-side capacitance of the transformer 108 or other primary-side components so that a reduced resonant tank capacitor or no resonant tank capacitor is present.

The primary winding 106 has a number of turns n times greater than or less than a number of turns y of the secondary winding 110. In embodiments of the present invention, the transformer is selected so that this turns ratio n is within plus or minus 25% of a calculated turns ratio $n_c$. In an embodiment, the calculated turns ratio $n_c$ is in a range from $[99\% \times V_{max}(sV_o)^{-1}] \leq n_c \leq [V_{max}(sV_o)^{-1}]$, where s is a switching factor of the switching bridge. This range of allowable values for $n_c$ takes into account voltage losses that may occur.

In a first embodiment, the power converter is a half-bridge converter in which the switching bridge 102 includes two switches and the switching factor s is equal to 2. In a second embodiment, the power converter is a full-bridge converter in which the switching bridge 102 includes four switches and the switching factor s is equal to 1. In embodiments of the present invention, the rectifier 116 may also be either a half-bridge rectifier made up of two diodes or a full-bridge rectifier made up of four diodes. In other embodiments, the rectifier is a synchronous rectifier.

FIG. 1B shows an equivalent AC circuit based on a first harmonic approximation of the circuit of FIG. 1A. The equivalent AC circuit replaces the primary winding, the transformer core, and the secondary side circuit with a reflected load resistance 128 having a resistance $R_e$ equal to $8\pi^{-2}n_c^2V_o^2P_o^{-1}$. The equivalent AC circuit also replaces the DC voltage source and the switching bridge with an AC voltage source 122 that provides a sinusoidal input voltage $V_{in\_ac}$ at the frequency $f_{sw}$ of the switched voltage signal $V_{sw}$. The equivalent AC circuit operates at an angular operating frequency w corresponding to the switching frequency such that $\omega=2\pi f_{sw}$.

The equivalent AC circuit has a load impedance that is the product over the sum of the impedances of the reflected load resistance $R_e$ and the magnetizing inductance $L_m$ such that:

$$Z_1(\omega)=j\omega L_m R_e(R_e+j\omega L_m)^{-1}=[\omega L_m+jR_e][\omega_o L_m R_e^{-1}+R_e(\omega_o L_m)^{-1}]^{-1} \quad \text{(Eq. 2)}$$

The equivalent AC circuit also has a resonant impedance $Z_r(\omega)$ that is the sum of the impedances of the resonant capacitance $C_r$ and the resonant inductance $L_r$:

$$Z_r(\omega)=j\omega L_r+(j\omega C_r)^{-1}=j\omega L_r(1-L_r^{-1}C_r^{-1}\omega^{-2}) \quad \text{(Eq. 3)}$$

By substituting an angular resonant frequency $\omega_r$ that is equal to $(L_r C_r)^{-0.5}$, Equation 3 may be rewritten as:

$$Z_r(\omega)=-j\omega L_r[(\omega_r/\omega)^2-1] \quad \text{(Eq. 4)}$$

This angular resonant frequency $\omega_r$ corresponds to a resonant switching frequency $f_r$ that is equal to $2\pi(L_r C_r)^{-0.5}$. When the angular operating frequency w is equal to this angular resonant frequency $\omega_r$, a resonance occurs such that the resonant impedance $Z_r$ is equal to zero and maximum current flows through the series resonant capacitance $C_r$ and series resonant inductance $L_r$.

The equivalent AC circuit also has an input impedance that is equal to the sum of the resonant impedance and the load impedance such that $Z_i(\omega)=Z_1(\omega)+Z_r(\omega)$. Because the real component of the input impedance is always positive, the sign of the angle of the input impedance is the same as the sign of the imaginary component of the input impedance $\text{Im}(Z_i)$, such that when the angle of the input impedance is less than 0 the LLC converter operates in capacitive mode and the input voltage lags behind the input current. The MOSFET body diodes in the switching bridge will then be exposed to hard commutation which dramatically increases switching losses.

To avoid these switching losses and to allow for MOSFET soft-switching during startup, the LLC converter is instead operated in inductive mode such that input current lags behind the input voltage. This LLC operates in this inductive mode at frequencies that are high enough that the angle of the input impedance and accordingly the imaginary component of the input impedance are greater than or equal to zero.

The equivalent AC circuit also has a transfer function having a gain $G(\omega)$ equal to $V_{o\_ac}V_{in\_ac}^{-1}$. As will be explained in connection with FIG. 2, a maximum gain is achieved when the LLC converter is operated at a lowest angular operating frequency $\omega_o$ that is still above the capacitive operating range.

Referring to both FIGS. 1A and 1B, the components of the LLC converter are chosen to satisfy design parameters that include: the minimum DC input voltage $V_{min}$ and the maximum DC input voltage $V_{max}$, the minimum switching frequency $f_{min}$ and the maximum switching frequency $f_{max}$ of the switching bridge 102, a target output voltage $V_o$, and a target output power $P_o$. The selected components support a zero-angle operating frequency $\omega_o$ that corresponds to the minimum switching frequency $f_{min}$ parameter such that $\omega_o \approx 2\pi f_{min}$, so that the converter always operates in inductive mode. The selected components support an angular resonant frequency $\omega_r$ that corresponds to the maximum switching frequency $f_{max}$ parameter such that $\omega_r \approx 2\pi f_{max}$, so that the converter always operates in boost mode below the resonant frequency.

The selected components of the LLC converter also support a maximum gain $G_{max}$ corresponding to the minimum and maximum input voltage parameters such that $G_{max} \approx V_{max}V_{min}^{-1}$, so that the gain may be increased from a minimum gain when $V_{in}$ is equal to $V_{max}$ up to a gain of $V_{max}V_{min}^{-1}$ when $V_{in}$ is equal to $V_{min}$. The gain is increased by decreasing the switching frequency of the switching bridge 102 when the input voltage drops. The selected components also support an equivalent reflected load resistance $R_e$, which as described earlier is a function of the calculated turns ratio $n_c$. Thus, $R_e$ corresponds to the target output voltage and maximum input power such that $[8(\pi s)^{-2}(99\% \times V_{max})^2 P_o^{-1}] \leq R_e \leq [8(\pi s)^{-2}V_{max}^2 P_o^{-1}]$.

Figure 2:
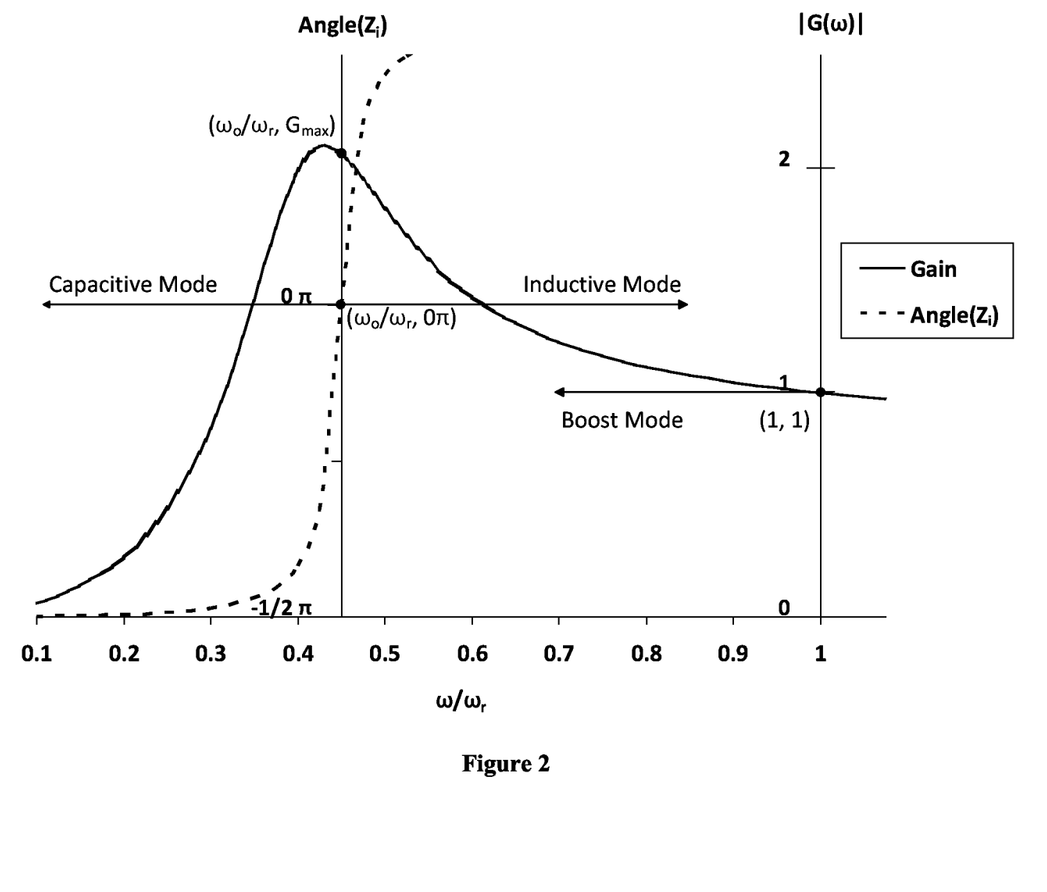
FIG. 2 is a graph illustrating both the converter gain and angle of the converter's input impedance as a function of the converter's operating frequency in accordance with embodiments of the present invention.
Figure 3:
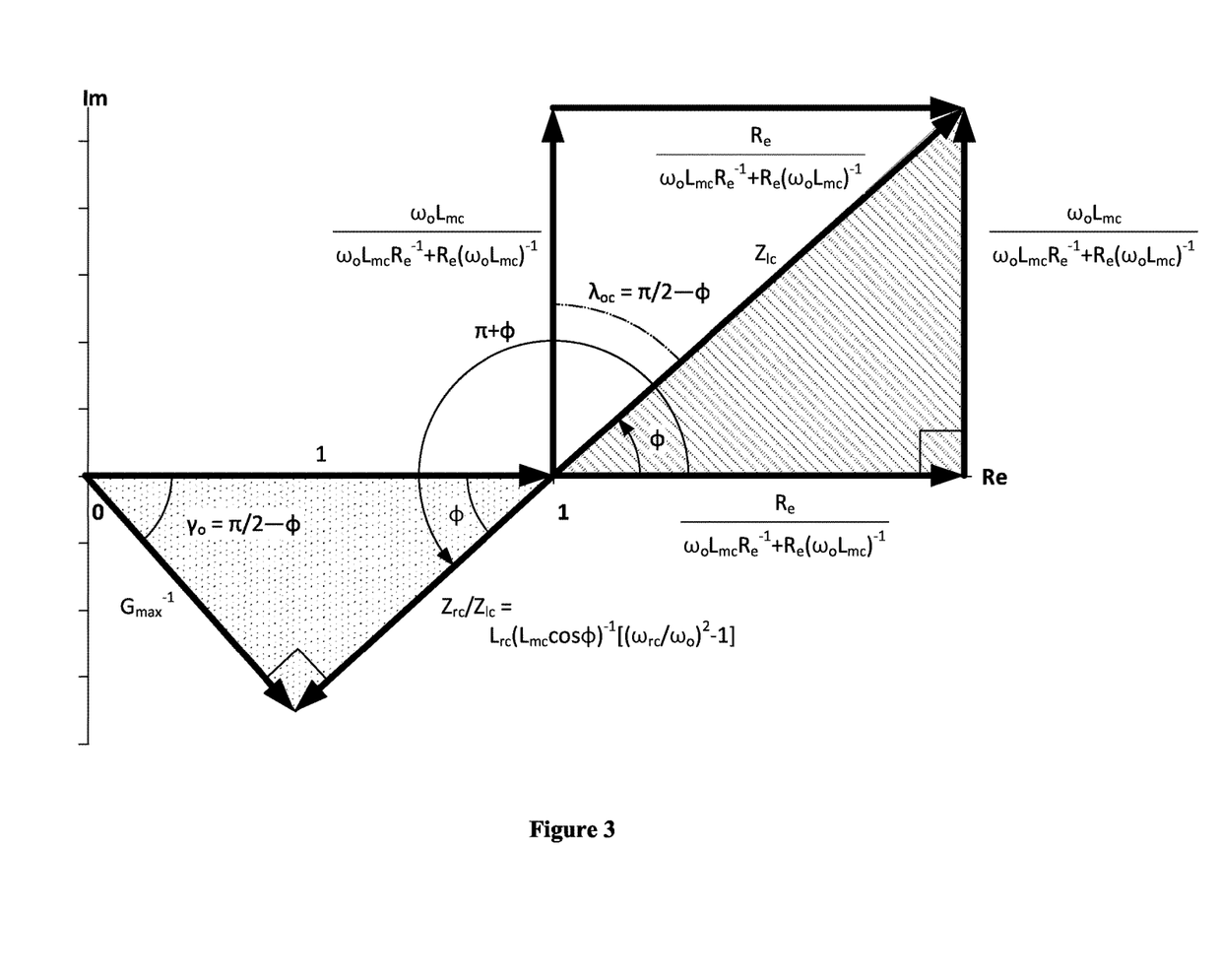
FIG. 3 is a vector diagram illustrating expressions for the converter's calculated load impedance and calculated gain when the converter's input impedance angle is zero and when using calculated component values in accordance with embodiments of the present invention.

In particular, the LLC converter components are selected so that actual values of the turns ratio n, magnetizing inductance $L_m$, resonant capacitance $C_r$, and resonant inductance $L_r$ are each within plus or minus 25% of respective calculated values $n_c$, $L_{mc}$, $C_{rc}$, and $L_{rc}$, which are calculated based on the power converter's design parameters. An expression for the calculated turns ratio $n_c$ is previously described. The calculated magnetizing inductance $L_{mc}$ is equal to $R_e(2\pi f_{min})^{-1}\tan(\phi)$, where $\phi$ is a load angle complement equal to a $\sin(V_{min}V_{max}^{-1})$. The calculated resonant inductance $L_{rc}$ is equal to $L_{mc}(f_{max}^2 f_{min}^{-2}-1)^{-1}\cos^2(\phi)$. The calculated resonant capacitance $C_{rc}$ is equal to $L_{r\_c}^{-1}(2\pi f_{max})^{-2}$. FIGS. 2 and 3 illustrate how the foregoing expressions for calculating $L_{mc}$, $C_{rc}$, and $L_{rc}$ component values support design parameters such that $\omega_o \approx 2\pi f_{min}$, $\omega_r \approx 2\pi f_{max}$, and $G_{max} \approx V_{max}V_{min}^{-1}$. Additionally, examples of using calculated values for two LLC converter designs are shown in Table 1 below, along with actual component values of two demonstration boards that were designed in accordance with the calculated values:

TABLE 1

Calculated Vs. Actual Component Values

| Bridge Type | $V_{min}$ (V) | $V_{max}$ (V) | $V_o$ (V) | $P_o$ (W) | $f_{min}$ (kHz) | $f_{max}$ (kHz) | | $L_r$ (μH) | $C_r$ (nF) | $L_m$ (μH) | n |
|---|---|---|---|---|---|---|---|---|---|---|---|
| Half (s = 2) | 350 | 384 | 12 | 600 | 90 | 157 | Calc. | 15.9 | 64.6 | 192 | 15.9 |
| | | | | | | | Actual | 15.5 | 66 | 195 | 16 |
| | | | | | | | Actual/Calc. | 97.5% | 102.2% | 101.6% | 110.6% |
| Full (s = 1) | 16 | 33 | 400 | 125 | 50 | 110 | Calc. | 2.48 | 843 | 12.5 | $12.1^{-1}$ |
| | | | | | | | Actual | 2.3 | 940 | 12.2 | $12^{-1}$ |
| | | | | | | | Actual/Calc. | 92.7% | 111.5% | 97.6% | 100.8% |

Referring now to FIG. 2, typical curves are illustrated for both the converter gain $G(\omega)$ and input impedance angle. The independent variable $\omega/\omega_r$ is an angular operating frequency that has been normalized relative to the angular resonant frequency. The gain $G(\omega)$ is equal to $V_{o\_ac}V_{in\_ac}^{-1}$, which means that $G(\omega)$ can be expressed in terms of the load impedance $Z_1$, the resonant impedance $Z_r$ and the input impedance $Z_i$ as:

$$G(\omega)=Z_1(\omega)Z_i(\omega)^{-1}=Z_1(\omega)[Z_1(\omega)+Z_r(\omega)]^{-1} \quad \text{(Eq. 5)}$$

Using Equations 2 and 3, Equation 5 may be inverted to obtain $G(\omega)^{-1}$, the reciprocal of the gain, in terms of the resonant inductance $L_r$ and the angular resonant frequency $\omega_r$:

$$G(\omega)^{-1}=1+Z_r(\omega)/Z_1(\omega)=1-j\omega L_r[(\omega_r/\omega)^2-1]Z_1(\omega)^{-1} \quad \text{(Eq. 6)}$$

In these calculations, when the angular operating frequency $\omega$ is less than or equal to the angular resonant frequency $\omega_r$, the term $[(\omega_r/\omega)^2-1]$ is greater than or equal to zero so that the converter operates with a gain greater than or equal to one. As the angular operating frequency drops further below the angular resonant frequency, the converter operates in boost mode such that the term $[(\omega_r/\omega)^2-1]$ increases and the gain of the converter increases. Maximum gain is thus achieved at a lowest angular operating frequency that is still above the capacitive operating range (i.e., $\text{Im}(Z_i) \geq 0$). This condition is fulfilled at the zero-angle operating frequency $\omega_o$ where the angle and the imaginary component of the input impedance are equal to zero.

At this zero-angle operating frequency, the magnitude of the gain $|G(\omega_o)|$ is maximized and the converter operates in resistive mode with the input current in phase with the input voltage. Using the properties of the gain $G(\omega_o)$ at this frequency $\omega_o$, an expression for $\gamma_o$, the gain angle at $\omega_o$, can be derived. First, the input impedance of the converter can be written as the product of the load impedance and the reciprocal of the gain such that $Z_1(\omega)G(\omega)^{-1}=|Z_i|\exp[j(\lambda-\gamma)]$, where $\lambda-\gamma$ is the angle of the input impedance in terms of the angle $\lambda$ of the load impedance and the angle $\gamma$ of the gain. When the angle of the input impedance is equal to zero, the difference between the load impedance angle and the gain angle $\lambda_o-\gamma_o$ is also equal to zero. Thus, the gain angle $\gamma_o=\lambda_o$, where $\lambda_o$ is the load impedance angle when the angular operating frequency $\omega$ equals $\omega_o$.

Referring now to FIG. 3, a vector diagram is shown that illustrates expressions for a calculated load impedance $Z_{lc}(\omega_o)$ and the calculated gain $G_c(\omega_o)$ when the angular operating frequency $\omega$ equals $\omega_o$ and when calculated component values are used. The real components of the vectors are plotted against the horizontal axis and the imaginary components are plotted against the vertical axis. A change of variables employs a load angle complement $\phi$ in terms of $\gamma_{oc}$ (the angle of the calculated gain at $\omega_o$) and $\lambda_{oc}$ (the angle of the calculated load impedance at $\omega_o$) such that:

$$\phi = -\lambda_{oc}+\pi/2 = -\gamma_{oc}+\pi/2 \quad \text{(Eq. 7)}$$

Using this change of variables, the calculated load impedance at $\omega_o$ may then be expressed as:

$$Z_{lc}(\omega_o)=|Z_{lc}(\omega_o)|\exp[j(\pi/2-\phi)]=[\omega L_{mc}+jR_e][\omega_o L_{mc}R_e^{-1}+R_e(\omega_o L_{mc})^{-1}]^{-1} \quad \text{(Eq. 8)}$$

This expression for the calculated load impedance is illustrated in the dashed triangle, inspection of which shows that $L_{mc}=R_e\omega_o^{-1}\tan\phi$. To derive an expression for the calculated gain, an expression is first derived for the calculated impedance ratio $Z_{rc}(\omega_o)/Z_{lc}(\omega_o)$ in terms of $\phi$, $\omega_o$, and the calculated resonant angular frequency $\omega_{rc}$:

$$Z_{rc}(\omega_o)Z_{lc}(\omega_o)^{-1}=-j\omega L_{rc}[(\omega_{rc}/\omega_o)^2-1](R_e+j\omega_o L_{mc})(j\omega_o L_{mc}R_e)^{-1}=-jL_{rc}L_{mc}^{-1}[(\omega_{rc}/\omega_o)^2-1](1+j\tan\phi)=1-L_{rc}L_{mc}^{-1}[(\omega_{rc}/\omega_o)^2-1](\cos\phi+j\sin\phi)(\cos\phi)^{-1}=-L_{rc}L_{mc}^{-1}[(\omega_{rc}/\omega_o)^2-1](\cos\phi)^{-1}\exp(j\phi) \quad \text{(Eq. 9)}$$

Since the LLC converter is being designed to operate in boost mode in that the calculated angular resonant frequency $\omega_{rc}$ corresponds to the design parameter for the maximum switching frequency, the zero-angle operating frequency $\omega_o$ will be less than the calculated angular resonant frequency $\omega_{rc}$ and the term $[(\omega_{rc}/\omega_o)^2-1]$ will be greater than zero. Using $\exp(j\pi)=-1$ and taking $-\pi/2\leq\phi\leq\pi/2$, Equation 9 may be rewritten as:

$$Z_{rc}(\omega_o)/Z_{lc}(\omega_o)=|L_{rc}L_{mc}^{-1}[(\omega_{rc}/\omega_o)^2-1](\cos\phi)^{-1}|\exp[j(\pi+\phi)], -\pi/2\leq\phi\leq\pi/2 \quad \text{(Eq. 10)}$$

Thus, the angle of the calculated impedance ratio is $\pi+\phi$ when $-\pi/2\leq\phi\leq\pi/2$. Because the gain is maximized at $\omega_o$, therefore the calculated gain $G_c(\omega_o)=G_{max}[\exp(j\gamma_{oc})]$, where $G_{max}$ is a scalar representing the maximum magnitude of the calculated gain. Since the angle of the calculated gain $\gamma_{oc}=-\phi+\pi/2$, therefore the reciprocal of the calculated gain may be expressed as:

$$G_c(\omega_o)^{-1}=G_{max}^{-1}\exp[-j(-\phi+\pi/2)]=1+|Z_{rc}(\omega_o)/Z_{lc}(\omega_o)|\exp[j(\pi+\phi)], -\pi/2\leq\phi\leq\pi/2 \quad \text{(Eq. 11)}$$

This expression for the gain in Equation 11 is illustrated in the dotted triangle of FIG. 3. Inspecting the dotted triangle provides the following two equations:

$$\phi = a\sin(G_{max}^{-1}) \quad \text{(Eq. 12)}$$

$$|Z_{rc}(\omega_o)/Z_{lc}(\omega_o)|=|L_{rc}L_{mc}^{-1}[(\omega_{rc}/\omega_o)^2-1]|(\cos\phi)^{-1}=\cos(\phi) \quad \text{(Eq. 13)}$$

Therefore, the following equation for the calculated resonant inductance is also true:

$$L_{rc}=L_{mc}\cos^2(\phi)[(\omega_{rc}/\omega_o)^2-1]^{-1} \quad \text{(Eq. 14)}$$

As an alternative to this graphical demonstration, a complex-variable expression for the reciprocal maximum gain $G_{max}^{-1}$ can be derived directly:

$$G_{max}^{-1}=\exp[j(\pi/2-\phi)]G_c(\omega_o)^{-1}=\exp[j(\pi/2-\phi)](1+Z_{rc}(\omega_o)Z_{lc}(\omega_o)^{-1})=\exp[j(\pi/2-\phi)][1+\exp[j(\phi+\pi)]|L_{rc}L_{mc}^{-1}[(\omega_{rc}/\omega_o)^2-1]|(\cos\phi)^{-1}]=[\exp[j(\pi/2-\phi)]+\exp[j(3\pi/2)]|L_{rc}L_{mc}^{-1}[(\omega_{rc}/\omega_o)^2-1]|(\cos\phi)^{-1}]=\sin(\phi_c)+j[\cos(\phi)-|L_{rc}L_{mc}^{-1}[(\omega_{rc}/\omega_o)^2-1]|(\cos\phi)^{-1}]] \quad \text{(Eq. 15)}$$

Since $G_{max}^{-1}$ is a scalar with no imaginary component, it follows that the imaginary component of the right-hand expression of Equation 15 must be equal to zero:

$$\cos(\phi)-L_{rc}L_{mc}^{-1}[(\omega_{rc}/\omega_o)^2-1]\cos\phi^{-1}=0 \quad \text{(Eq. 16)}$$

By noting that $\omega_o$ is chosen to be approximately equal to $2\pi f_{min}$ and the maximum switching frequency is chosen such that $\omega_{rc}\approx 2\pi f_{max}$, the following expressions may be derived:

$$L_{rc}=L_{mc}\cos^2(\phi)[(\omega_{rc}/\omega_o)^2-1]^{-1}\approx L_{mc}\cos^2(\phi)[(f_{max}/f_{min})^2-1]^{-1} \quad \text{(Eq. 17)}$$

$$C_{rc}=L_{rc}^{-1}\omega_{rc}^{-2}\approx L_{rc}^{-1}(2\pi f_{max})^{-2} \quad \text{(Eq. 18)}$$

Recalling Equations 7 and 8, the calculated magnetizing inductance may also be expressed as:

$$L_{mc}=R_e\omega_o^{-1}\tan\phi\approx R_e(2\pi f_{min})^{-1}\tan(\phi) \quad \text{(Eq. 19)}$$

With the imaginary component of the right-hand expression of Equation 15 set to zero, it then follows that $G_{max}^{-1}=\sin(\phi)$. Since $G_{max}\approx V_{max}V_{min}^{-1}$ and $n_c\approx V_{max}(sV_o)^{-1}$, therefore:

$$\phi = a\sin(G_{max}^{-1})\approx a\sin(V_{min}V_{max}^{-1})\approx a\sin(V_{min}(n_c s V_o)^{-1}) \quad \text{(Eq. 20)}$$

Figure 4:
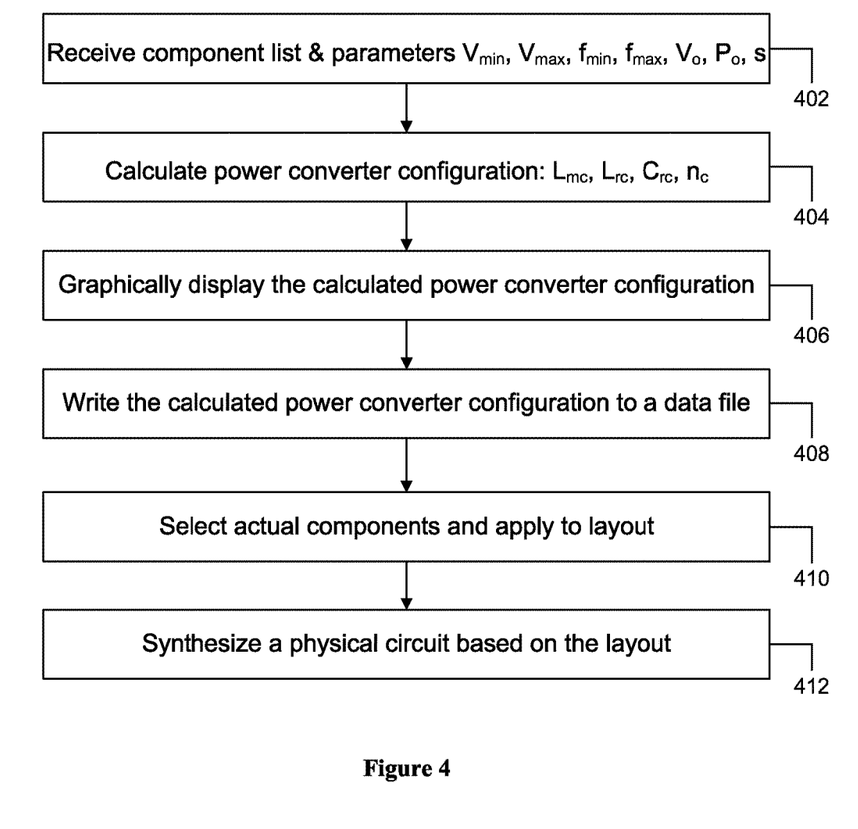
FIG. 4 is a flow diagram showing a method for designing an LLC converter in accordance with embodiments of the present invention.

FIG. 4 shows an embodiment method for designing the power converter system of FIG. 1 in accordance with embodiments of the present invention. At step 402, at least one design system processor receives a list of available components and a set of power converter design parameters. These design parameters may be received as a first set of cells in a spreadsheet. The design parameters include the minimum DC input voltage $V_{min}$ and the maximum DC input voltage $V_{max}$, as well as the minimum switching frequency $f_{min}$ and the maximum switching frequency $f_{max}$ of the switching bridge 102, a target output voltage $V_o$, a target output power $P_o$, and the switching factor s. At step 404, the design system then calculates a calculated power converter configuration, which includes the calculated magnetizing inductance $L_{mc}$, the calculated resonant inductance $L_{rc}$, the calculated resonant capacitance $C_{rc}$, and the calculated turns ratio $n_c$. Each of these calculated component values are calculated as previously described in reference to FIG. 1 above.

At step 406, the design system graphically displays the calculated power converter configuration at a user terminal. For example, the system may display a second set of cells in the spreadsheet, where the values of the second set of cells include the calculated power converter configuration. At 408, the design system writes the calculated power converter configuration to a data file, which may be a spreadsheet or any form of data file.

At step 410, the design system selects actual components based on the list of available components as well as the calculated power converter configuration, and applies these actual component values to a layout of a physical circuit for the power converter. The layout component values include an actual turns ratio n, an actual magnetizing inductance $L_m$, an actual resonant inductance $L_r$, and an actual resonant capacitance $C_r$ that are each within plus or minus 25% of their respective calculated values $n_c$, $L_{mc}$, $L_{rc}$, and $C_{rc}$.

In a first embodiment, the layout components are selected from the list of available components such that the layout component values are each as close as possible to the calculated component values of the calculated power converter configuration. In a second embodiment, the layout components are selected from the list such that the layout component values jointly maximize a figure of merit when compared to the calculated values of the calculated power converter configuration. This figure of merit could be, for example, an absolute difference between $f_{max}$ and a resonant frequency of the selected components, a maximum likelihood, an average percent error, or a weighted metric based on the dollar, space, or power requirements of components.

Referring again to FIG. 4, at step 414, the design system then synthesizes the physical power converter circuit based on the layout.

Figure 5:
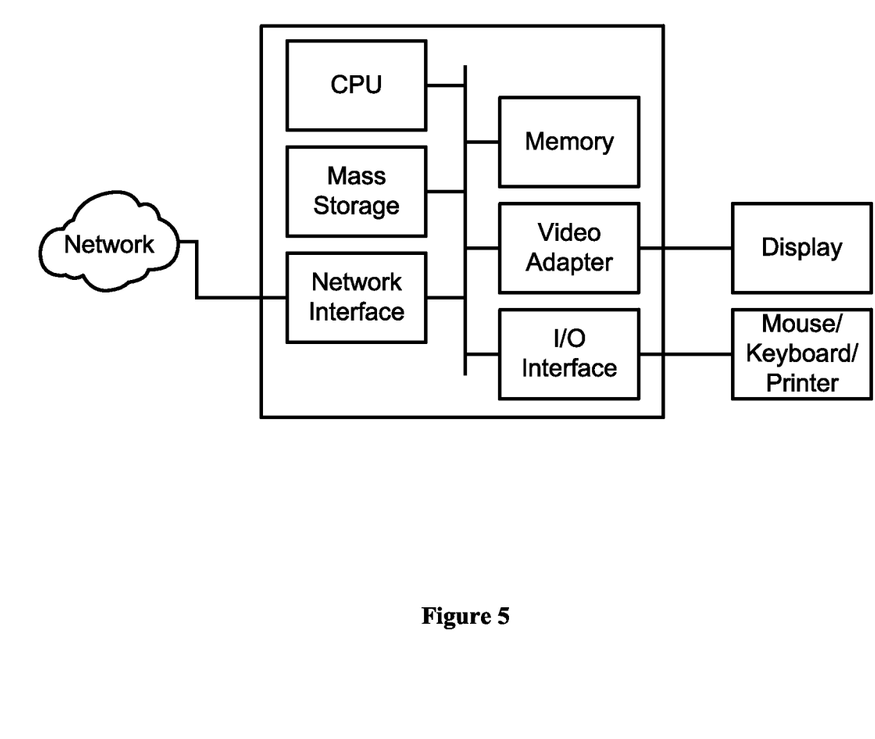
FIG. 5 is a block diagram of a processing system that may be used for implementing some of the devices and methods disclosed herein in accordance with embodiments of the present invention.

Referring now to FIG. 5, a block diagram of a processing system is shown that may be used for implementing some of the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. In an embodiment, the processing system includes a computer workstation. The processing system may include a processing unit equipped with one or more input/output devices, such as a speaker, microphone, mouse, touchscreen, keypad, keyboard, printer, display, and the like. The processing unit may include a CPU, memory, a mass storage device, a video adapter, and an I/O interface connected to a bus. In an embodiment, multiple processing units in a single processing system or in multiple processing systems may form a distributed processing pool or distributed editing pool.

The bus may be one or more of any type of several bus architectures including a memory bus or memory controller, a peripheral bus, video bus, or the like. The CPU may include any type of electronic data processor. The memory may include any type of system memory such as random access memory (RAM), static RAM (SRAM), dynamic RAM (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may include any type of storage device configured to store data, programs, and other information and to make the data, programs, and other information accessible via the bus. The mass storage device may include, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may include wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like. The network interface may be configured to have various connection-specific virtual or physical ports communicatively coupled to one or more of these remote devices.

Illustrative embodiments of the present invention have the advantage of providing techniques for designing LLC converters that operate within a specific range of switching frequencies in order to reduce interference from electromagnetic signals and to switching losses and component size. In some embodiments, the use of spreadsheet software tools allow LLC converter designers to rapidly calculate appropriate inductance, capacitance, and turns ratio values. Other embodiment systems may use, for example, EDA software tools that allow designers of electronic systems to design and analyze LLC power converters as an integral part of the design flow for an entire semiconductor chip.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for designing an inductance-inductance-capacitance (LLC) power converter, the method comprising:
receiving, by a processor, power converter design parameters of the LLC power converter, wherein the LLC power converter comprises a switching bridge coupled to a primary winding of a transformer, a resonant inductor and a resonant capacitor coupled in series between the switching bridge and the primary winding of the transformer, and a secondary side circuit coupled to a secondary winding of the transformer, the power converter design parameters comprising:
a minimum DC input voltage $V_{min}$ and a maximum DC input voltage $V_{max}$ to be received by the switching bridge,
a minimum switching frequency $f_{min}$ and a maximum switching frequency $f_{max}$ of the switching bridge, and a target output voltage $V_o$ and a target output power $P_o$ to be output by the secondary side circuit;

calculating, by the processor, a first power converter configuration comprising:
- a calculated magnetizing inductance $L_{mc}$ of the primary winding equal to $R_e\tan(\phi)(2\pi f_{min})^{-1}$, wherein $\phi$ is a load angle complement equal to $\text{asin}(V_{min}V_{max}^{-1})$, and $R_e$ is an equivalent reflected load resistance of the power converter,
- a calculated resonant inductance $L_{rc}$ of the resonant inductor equal to $L_{mc}\cos^2(\phi)(f_{max}^2 f_{min}^{-2}-1)^{-1}$, and
- a calculated resonant capacitance $C_{rc}$ of the resonant capacitor equal to $L_{rc}^{-1}(2\pi f_{max})^{-2}$;

writing, by the processor, the first power converter configuration to a non-transitory computer readable medium;

determining layout component values based on the first power configuration; and physically implementing the LLC power converter using the layout component values.

2. The method of claim 1, wherein
the power converter design parameters further comprise a switching factor s that is equal to 2 when the switching bridge has a half-bridge configuration and that is equal to 1 when the switching bridge has a full-bridge configuration; and
the first power converter configuration further comprises a calculated turns ratio $n_c$ of the primary winding relative to the secondary winding of the transformer comprised in the power converter,
wherein $n_c$ is not less than $0.99V_{max}(sV_o)^{-1}$ and is not greater than $V_{max}(sV_o)^{-1}$; and the equivalent reflected load resistance $R_e$ equals $8\pi^{-2}n_c^2 V_o^2 P_o^{-1}$.

3. The method of claim 1, further comprising graphically displaying the first power converter configuration at a user terminal.

4. The method of claim 3, wherein
the receiving the power converter design parameters comprises:
receiving a first set of cells in a spreadsheet, wherein values of the first set of cells comprise the power converter design parameters; and
the graphically displaying the first power converter configuration comprises:
displaying a second set of cells in the spreadsheet, wherein values of the second set of cells comprise the first power converter configuration.

5. The method of claim 1, wherein the non-transitory computer readable medium is a file.

6. The method of claim 5, further comprising:
receiving, by the processor, a list of available components; and
determining the layout component values comprises selecting, by the processor, layout component values in accordance with the list of available components and the first power converter configuration, the layout component values comprising:
an actual turns ratio $n_a$ of the transformer greater than $c_1 n_c$ and less than $c_2 n_c$, wherein $c_1$ is not less than 0.75 and $c_2$ is not greater than 1.25,
an actual magnetizing inductance $L_{m\_a}$ of the primary winding of the transformer greater than $c_1 L_{m\_c}$ and less than $c_2 L_{m\_c}$;
an actual resonant inductance $L_{r\_a}$ of the resonant inductor greater than $c_1 L_{r\_c}$ and less than $c_2 L_{r\_c}$; and
an actual resonant capacitance $C_{r\_a}$ of the resonant capacitor greater than $c_1 C_{r\_c}$ and less than $c_2 C_{r\_c}$.

7. The method of claim 6, wherein the selecting the layout component values comprises at least one of:
selecting layout components from the list of available components such that the layout component values are closest to component values in the first power converter configuration; and
selecting layout components from the list of available components such that the layout component values jointly maximize a figure of merit in accordance with the first power converter configuration.

8. A power converter design system comprising a non-transitory computer-readable medium storing programming, wherein the programming comprises instructions to:
receive power converter design parameters of an inductance-inductance-capacitance (LLC) power converter, wherein the LLC power converter comprises a switching bridge coupled to a primary winding of a transformer, a resonant inductor and a resonant capacitor coupled in series between the switching bridge and the primary winding of the transformer, and a secondary side circuit coupled to a secondary winding of the transformer, the power converter design parameters comprising:
a minimum DC input voltage $V_{min}$ and a maximum DC input voltage $V_{max}$ to be received by the switching bridge,
a minimum switching frequency $f_{min}$ and a maximum switching frequency $f_{max}$ of the switching bridge, and
a target output voltage $V_o$ and a target output power $P_o$ to be output by the secondary side circuit; calculate a first power converter configuration comprising:
a calculated magnetizing inductance $L_{mc}$ of the primary winding equal to $R_e\tan(\phi)(2\pi f_{min})^{-1}$, wherein $\phi$ is a load angle complement equal to $\text{asin}(V_{min}V_{max}^{-1})$, and $R_e$ is an equivalent reflected load resistance of the power converter,
a calculated resonant inductance $L_{rc}$ of the resonant inductor equal to $L_{mc}\cos^2(\phi)(f_{max}^2 f_{min}^{-2}-1)^{-1}$, and
a calculated resonant capacitance $C_{rc}$ of the resonant capacitor equal to $L_{rc}^{-1}(2\pi f_{max})^{-2}$;
write the first power converter configuration to a non-transitory computer readable medium;
determine layout component values based on the first power configuration; and physically implement the LLC power converter using the layout component values.

9. The system of claim 8, wherein
the power converter design parameters further comprise a switching factor s that is equal to 2 when the switching bridge has a half-bridge configuration and that is equal to 1 when the switching bridge has a full-bridge configuration; and
the first power converter configuration further comprises a calculated turns ratio $n_c$ of the primary winding relative to the secondary winding of a transformer comprised in the power converter,
wherein $n_c$ is not less than $0.99V_{max}(sV_o)^{-1}$ and is not greater than $V_{max}(sV_o)^{-1}$; and the equivalent reflected load resistance $R_e$ equals $8\pi^{-2}n_c^2 V_o^2 P_o^{-1}$.

10. The system of claim 8, wherein the programming further comprises instructions to graphically display the first power converter configuration at a user terminal.

11. The system of claim 10, wherein
the instructions to receive the power converter design parameters comprise instructions to receive a first set of cells in a spreadsheet, wherein values of the first set of cells comprise the power converter design parameters; and the instructions to graphically display the first power converter configuration comprise instructions to display a second set of cells in the spreadsheet, wherein values of the second set of cells comprise the first power converter configuration.

12. The system of claim 8, wherein the non-transitory computer readable medium is a file.

13. The system of claim 12, wherein the programming further comprises instructions to:

receive a list of available components; and determine the layout component values by selecting the layout component values in accordance with the list of available components and the first power converter configuration, the layout component values comprising:

an actual turns ratio $n_a$ of the transformer greater than $c_1 n_c$ and less than $c_2 n_c$, wherein $c_1$ is not less than 0.75 and $c_2$ is not greater than 1.25, an actual magnetizing inductance $L_m$ of the primary winding of the transformer greater than $c_1 L_{mc}$ and less than $c_2 L_{mc}$;

an actual resonant inductance $L_r$ of the resonant inductor greater than $c_1 L_{rc}$ and less than $c_2 L_{rc}$; and an actual resonant capacitance $C_r$ of the resonant capacitor greater than $c_1 C_{cr}$ and less than $c_2 C_{rc}$.

14. The system of claim 13, wherein the instructions to select the layout component values comprise at least one of:

instructions to select the layout component values from the list of available components such that the layout component values are closest to component values in the first power converter configuration; and instructions to select the layout component values from the list of available components such that the layout component values jointly maximize a figure of merit in accordance with the first power converter configuration.

15. The system of claim 13, wherein the programming further comprises instructions to:

apply the layout component values to the file, wherein the file is a layout representing a physical circuit for the power converter.

16. The system of claim 15, wherein the programming further comprises instructions to synthesize the physical circuit in accordance with the layout.

17. A power conversion system comprising:

a switching bridge comprising a plurality of switches coupled to a DC power source having a minimum input voltage $V_{min}$ and a maximum input voltage $V_{max}$, wherein the switching bridge is configured to switch at a frequency that is not less than a minimum frequency $f_{min}$ and that is not greater than a maximum frequency $f_{max}$;

a primary side circuit coupled to the switching bridge, the primary side circuit comprising a primary winding of a transformer; and a secondary winding magnetically coupled to the primary winding through a core of the transformer, and an output terminal coupled to the secondary winding and configured to supply an output voltage that is not greater than a maximum output voltage $V_o$ and an output power that is not greater than a maximum output power $P_o$;

wherein the transformer has a magnetizing inductance $L_m$ such that $L_m$ is greater than $c_1 R_e (2\pi f_{min})^{-1} \tan(\phi)$ and less than $c_2 R_e (2\pi f_{min})^{-1} \tan(\phi)$, wherein $c_1$ is not less than 0.75 and $c_2$ is not greater than 1.25, $\phi$ is a load angle complement equal to $\operatorname{asin}(V_{min} V_{max}^{-1})$, and $R_e$ is an equivalent reflected load resistance;

wherein the primary side circuit has a resonant inductance $L_r$ such that $L_r$ is greater than $c_1 Lm (f_{max}^2 f_{min}^{-2} - 1)^{-1} \cos^2(\phi)$ and $L_r$ is less than $c_2 L_m (f_{max}^2 f_{min}^{-2} - 1)^{-1} \cos^2(\phi)$; and wherein the primary side circuit has a resonant capacitance $C_r$ in series with the resonant inductance such that $C_r$ is greater than $c_1 L_r^{-1} (2\pi f_{max})^{-2}$ and less than $c_2 L_r^{-1} (2\pi f_{max})^{-2}$.

18. The system of claim 17, wherein the switching bridge comprises two switches; and the primary winding has a number of turns that is a multiple n times a number of turns of the secondary winding, wherein n is greater than $c_1 V_{max} (2V_o)^{-1}$ and less than $c_2 V_{max} (2V_o)^{-1}$; and $R_e$ is not less than $8(\pi s)^{-2} (0.99 V_{max})^2 P_o^{-1}$ and not greater than $8(\pi s)^{-2} V_{max}^2 P_o^{-1}$, wherein s is a switching factor equal to 2.

19. The system of claim 17, wherein the switching bridge comprises four switches;

the primary winding has a number of turns that is a multiple n times a number of turns of the secondary winding, wherein n is greater than $c_1 V_{max} V_o^{-1}$ and less than $c_2 V_{max} V_o^{-1}$; and $R_e$ is not less than $8\pi^{-2} (0.99 V_{max})^2 P_o^{-1}$ and not greater than $8\pi^{-2} V_{max}^2 P_o^{-1}$.

* * * * *